US006688228B2

(12) United States Patent
Hiraoka

(10) Patent No.: US 6,688,228 B2
(45) Date of Patent: Feb. 10, 2004

(54) PLANOGRAPHIC PRINTING PLATE PRECURSOR HAVING A SUPPORT WITH PITS

(75) Inventor: Saburou Hiraoka, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/865,091

(22) Filed: May 24, 2001

(65) Prior Publication Data

US 2002/0009574 A1 Jan. 24, 2002

(30) Foreign Application Priority Data

May 30, 2000 (JP) ........................................ 2000-160128

(51) Int. Cl.$^7$ ............................. B41N 1/08; B41N 1/14; B32B 7/08

(52) U.S. Cl. ........................ 101/462; 101/455; 101/457; 101/459

(58) Field of Search ................................. 101/455, 457, 101/462, 463.1, 465, 466, 467, 458, 459; 430/270.1, 302

(56) References Cited

U.S. PATENT DOCUMENTS 5,569,573 A * 10/1996 Takahashi et al. .......... 101/453
6,015,649 A * 1/2000 Mori .......................... 430/193
6,025,022 A * 2/2000 Matzinger ................ 101/463.1
6,136,425 A * 10/2000 Akiyama et al. ........ 428/314.2
6,180,213 B1 * 1/2001 Kuroki et al. .............. 428/195
6,183,936 B1 * 2/2001 Watkiss ...................... 430/302
6,230,621 B1 * 5/2001 Verschueren et al. ....... 101/467
6,295,927 B1 * 10/2001 Verschueren ................ 101/462
6,305,284 B1 * 10/2001 Watanabe et al. ........ 101/463.1
6,354,209 B1 * 3/2002 Van Aert et al. ............ 101/466
6,399,270 B1 * 6/2002 Mori et al. ................. 101/453

FOREIGN PATENT DOCUMENTS

JP 10-315644 * 12/1998
JP 11-84667 * 3/1999

OTHER PUBLICATIONS

Computer translation of JP 1–315,644.*

* cited by examiner

*Primary Examiner*—Stephen R. Funk
(74) *Attorney, Agent, or Firm*—Muserlian, Lucas and Mercanti

(57) ABSTRACT

Disclosed is a planographic printing plate precursor, comprising a hydrophilic support and an image forming layer containing oleophilic heat-fusible particles, wherein the hydrophilic support has voids and the void content is 20 to 40 ml/m$^2$.

14 Claims, 2 Drawing Sheets

PLANOGRAPHIC PRINTING PLATE PRECURSOR HAVING A SUPPORT WITH PITS

FIELD OF THE INVENTION

The present invention relates to a planographic printing plate precursor (hereinafter referred to also as a printing precursor) comprising an image forming layer containing heat-fusible particles and a method of manufacturing a planographic printing plate employing the precursor.

BACKGROUND OF THE INVENTION

Recently, as computers spread, a computer to plate (CTP) process, in which a printing plate is prepared by imagewise exposing directly a planographic printing plate based on image information without using an original film, is spreading in planographic printing plate making. This process does not require a film-making process, resulting in cost decrease and in simplification of the process. Heretofore, a planographic printing plate precursor of either a silver salt diffusion type or a photopolymerization type has been mainly used as a printing precursor for CTP, but this type of the printing precursor requires an alkali development process for image formation. Synchronized with the spread of CTP processes and office automation in the printing field, a planographic printing plate precursor has been desired which does not require an alkali developing solution nor an alkali development process, in view of environmental concern.

There is disclosure in Japanese Patent O.P.I. Publication Nos. 9-131850 and 9-127683 of techniques regarding planographic printing plate precursors which do not require a development process. According to these techniques, a planographic printing plate is manufactured by imagewise exposing a planographic printing plate precursor having on a hydrophilic support a water developable image forming layer containing heat-fusible particles employing a laser, mounting the exposed precursor without development on a printing machine, and then developing it with dampening water or ink. The techniques provide a plate-making process, which does not need a special automatic developing machine nor a troublesome developing process to workers.

However, the techniques as described above are not still complete. When a printing plate prepared according to those techniques is subjected to treatment for increasing printing durability, non-image portions are difficult to clear at the initial stage of printing, and when printing is carried out employing a printing plate, which is prepared from a printing precursor accidentally rubbed by finger nails according to those techniques, stains are likely to occur at the rubbed portions during printing. It is very difficult to simultaneously solve the above-described problems. Further, the printing precursor has the problem that when subjected to treatment for increasing printing durability, its performances after storage are fluctuated.

SUMMARY OF THE INVENTION

The present invention has been made in view of the above. An object of the invention is to provide a planographic printing plate precursor which increases printing durability, prevents stains produced due to the finger nail rubbing, reduces loss of printed paper sheets at the initial printing stage, and minimizes fluctuation of its performances after storage. Another object of the invention is to provide a method of manufacturing a planographic printing plate employing the precursor.

The above object of the invention has been attained by the following constitutions:

1. A planographic printing plate precursor comprising a hydrophilic support and an image forming layer containing oleophilic heat-fusible particles, wherein the hydrophilic support has voids and the void content is 20 to 40 ml/$m^2$.
2. The planographic printing plate precursor of item 1, wherein the hydrophilic support has pits on the surface on the image forming layer side, and the average radius ($\mu$m) of curvature of ten pits is more than one-half of the average particle diameter ($\mu$m) of the heat-fusible particles.
3. The planographic printing plate precursor of item 2, wherein the average depth ($\mu$m) of ten pits is less than the average particle diameter ($\mu$m) of the heat-fusible particles.
4. The planographic printing plate precursor of item 1, wherein the average particle diameter ($\mu$m) of the heat-fusible particles is not more than 1.0 $\mu$m.
5. The planographic printing plate precursor of item 1, wherein the heat-fusible particles contain a cross-linking agent.
6. The planographic printing plate precursor of item 5, wherein the cross-linking agent is an agent capable of combining with the hydrophilic support through a covalent bond or an ionic bond by heat application.
7. The planographic printing plate precursor of item 5, wherein the image forming layer other than the heat-fusible particles contains a cross-linking accelerator which promotes a cross-linking reaction of the cross-linking agent.
8. The planographic printing plate precursor of item 1, wherein the image forming layer other than the heat-fusible particles contains a cross-linking agent and the heat-fusible particles contain a cross-linking accelerator which promotes a cross-linking reaction of the cross-linking agent.
9. The planographic printing plate precursor of item 8, wherein the cross-linking agent is an agent capable of combining with the hydrophilic support through a covalent bond or an ionic bond by heat application.
10. The planographic printing plate precursor of item 1, wherein the heat-fusible particles have a melt viscosity of not more than 20 cps at 140° C.
11. The planographic printing plate precursor of item 1, wherein the heat-fusible particles have a penetration of not more than 1.
12. The planographic printing plate precursor of item 1, wherein the hydrophilic support comprises a hydrophilic layer, and the hydrophilic layer contains a hydrophilic binder or film-forming hydrophilic particles.
13. The planographic printing plate precursor of item 12, wherein the hydrophilic support contains porous silica particles or colloidal silica particles.
14. The planographic printing plate precursor of item 12, wherein the hydrophilic support is a plastic film with the hydrophilic layer provided thereon.
15. The planographic printing plate precursor of item 1, wherein the heat-fusible particles comprise wax.
16. The planographic printing plate precursor of item 1, wherein the image forming layer contains oligosaccharides.

101. A planographic printing plate precursor comprising a hydrophilic support, and provided thereon, a heat-sensitive image forming layer containing oleophilic heat-fusible particles, wherein the hydrophilic support has pits on the surface and the average radius (μm) of curvature of ten pits is greater than one-half of the average particle diameter (μm) of the heat-fusible particles.

102. The planographic printing plate precursor of item 101, wherein the average depth (μm) of ten pits is less than the average particle diameter (μm) of the oleophilic heat-fusible particles. 103. The planographic printing plate precursor of item 101 or 102, wherein the average particle diameter (μm) of the oleophilic heat-fusible particles is not more than 1.0 μm.

104. A planographic printing plate precursor comprising a hydrophilic support, and provided thereon, an image forming layer containing oleophilic heat-fusible particles, wherein the hydrophilic support has voids and the void content is 20 to 40 $ml/m^2$.

105. A planographic printing plate precursor comprising a hydrophilic support, and provided thereon, an image forming layer containing oleophilic heat-fusible particles, wherein the oleophilic heat-fusible particles contain a cross-linking agent.

106. The planographic printing plate precursor of item 105, wherein the cross-linking agent is an agent capable of combining with the hydrophilic support through a covalent bond or an ionic bond by heat application.

107. The planographic printing plate precursor of item 106, wherein the image forming layer contains a cross-linking accelerator which promotes a cross-linking reaction of the cross-linking agent.

108. A planographic printing plate precursor comprising a hydrophilic support, and provided thereon, an image forming layer containing oleophilic heat-fusible particles and a cross-linking agent, wherein the heat-fusible particles contains a cross-linking accelerator which promotes a cross-linking reaction of the cross-linking agent.

109. The planographic printing plate precursor of item 108, wherein the cross-linking agent is an agent capable of combining with the hydrophilic support through a covalent bond or an ionic bond by heat application.

110. The planographic printing plate precursor of any one of items 101 through 109, wherein the heat-fusible particles have a melt viscosity of not more than 20 cps at 140° C. and a penetration of not more than 1.

111. A method of manufacturing a planographic printing plate, the method comprising the steps of:

(a) imagewise exposing the planographic printing plate precursor of any one of items 101 through 110 by means of a laser or imagewise heating the planographic printing plate precursor of any one of items 101 through 110 by means of a thermal head;

(b) mounting the exposed or heated precursor on a plate cylinder of a printing machine; and (c) treating the mounted precursor with ink or a dampening water.

DETAILED DESCRIPTION OF THE INVENTION

Figure 1:
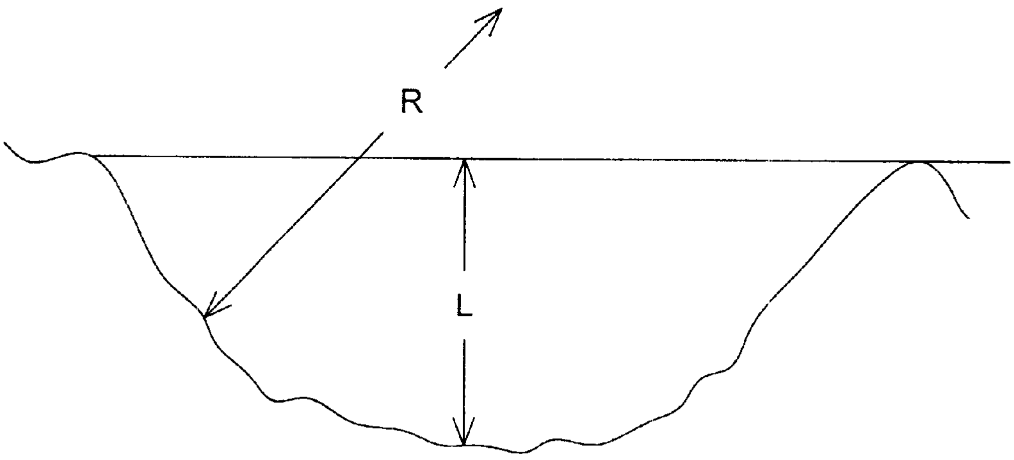
FIG. 1 shows a sectional view of a pit formed on the surface of a hydrophilic support.

Next, the present invention will be explained in detail.

The planographic printing plate precursor of the invention comprises a hydrophilic support, and an image forming layer containing oleophilic heat-fusible particles, wherein the hydrophilic support has voids and the void content is 20 to 40 $ml/m^2$.

(1) Planographic printing plate precursor Examples of the hydrophilic support used in the invention include an aluminum plate which has been electrolytically and/or mechanically grained, and then anodized. The typical example is an aluminum plate which has been grained, anodized and subjected to sealing treatment. The thickness of the hydrophilic support is preferably 10 to 500 μm, more preferably 100 to 500 μm, and most preferably 200 to 300 μm.

The graining methods of an aluminum plate include a mechanically graining method and an electrolytically etching method. The mechanically graining methods include a ball graining method, a brush graining method, a liquid horning graining method and a buff graining method. The above methods can be used singly or in combination according to an aluminum material composition. The electrolytically etching is a preferable graining method.

The electrolytically etching is carried out in a bath containing one or more of phosphoric acid, sulfuric acid, hydrochloric acid and nitric acid. After graining, the surface of the aluminum plate is optionally subjected to desmut treatment using an alkaline or acid solution to neutralize and washed with water.

The anodization is carried out by electrolyzing the surface of an aluminum plate in a solution containing one or more of sulfuric acid, chromic acid, oxalic acid, phosphoric acid and malonic acid, using the aluminum plate as an anode. The thickness of the anodization film formed is suitably 1 to 50 $mg/dm^2$, and preferably 10 to 40 $mg/dm^2$.

The sealing treatment is carried out by surface-treating the aluminum plate with a boiling water, steam, a sodium silicate solution or a dichromic acid solution. The aluminum plate can be coated with a water-soluble polymer solution or a zirconium fluoride solution to provide a subbing layer on the plate.

Another embodiment of the hydrophilic support comprises a flexible substrate and provided thereon, a hydrophilic layer containing a hydrophilic binder and/or hydrophilic particles such as film-forming colloidal silica particles, the layer being optionally cross-linked. Examples of the flexible substrate used in the hydrophilic support include a plastic film such as a saturated polyethylene terephthalate film, a polyethylene naphthalate film, a cellulose acetate film, a polystyrene film or a polycarbonate film, and paper. A subbing layer may be provided on the flexible substrate in order to increase adhesion between the substrate and the hydrophilic layer. The hydrophilic layer herein referred to may be a layer having a certain thickness, or may be a layer consisting of hydrophilic particles which are adhered onto the surface of the substrate. One or more intermediate layers may be provided between the hydrophilic layer and the flexible substrate. The thickness of the hydrophilic layer is preferably 1.0 to 10 μm, and more preferably 1.5 to 6.0 μm.

Examples of the hydrophilic binder include a homopolymer of vinyl alcohol, acrylamide, methylol-acrylamide, methylolmethacrylamide, acrylic acid, methacrylic acid, hydroxyethyl acrylate or hydroxyethyl methacrylate; a copolymer comprising one or more of the above-described monomers; maleic acid-vinylmethyl ether copolymer; and saccharides or their derivatives. Examples of the film-forming hydrophilic particles include rosary-shaped or necklace-shaped colloidal silica particles, alumina particles, titanium oxide particles, and other metal oxide particles. In the invention, colloidal silica particles are preferable in view of a film-forming property, and colloidal silica particles have an average particle diameter of preferably 5 to 100 nm, and more preferably 8 to 20 nm. The average particle diameter of the hydrophilic particles such as colloidal silica particles in the hydrophilic layer is preferably 5 to 100 nm, and more preferably 8 to 20 nm.

Examples of the cross-linking agent for cross-linking a hydrophilic binder include formaldehyde, glyoxal, polyisocyanate, and hydrolyzed tetraalkylorthosilicate.

The hydrophilic binder content of the hydrophilic layer is preferably 0 to 30 weight %, and more preferably 1 to 10 weight % based on the total solid content of the hydrophilic layer (except for particles for providing pits to the layer). The content of the hydrophilic particles such as colloidal silica particles in the hydrophilic layer is preferably 70 to 100 weight %, and more preferably 75 to 95 weight %. The above-described contents are important to secure hydrophilicity and water resistance in printing. The content of the cross-linking agent in the hydrophilic layer is preferably 0 to 1 weight %. The cross-linking agent content outside the above range may produce stains in printing.

The planographic printing plate precursor of the invention comprises a hydrophilic support having voids at a void content of 20 to 40 ml/m$^2$ and an image forming layer containing oleophilic heat-fusible particles. In the hydrophilic support having a void content of 20 to 40 ml/m$^2$, heat-fused oleophilic heat-fusible particles at exposed portions sufficiently permeate into the hydrophilic support, resulting in excellent printing durability. Further, the hydrophilic support having a void content of 20 to 40 ml/m$^2$ easily removes ink at non-image portions at the initial printing stage, which minimizes loss of printed materials, as well as provides excellent printing durability due to its sufficient strength. The voids in the invention are those existing in the hydrophilic support, which may have openings on the surface of the hydrophilic support on the heat sensitive image forming layer side or may exist in the form enclosed (buried) in the hydrophilic support. It is preferred that the voids in the invention have openings on the surface of the hydrophilic support on the heat sensitive image forming layer side. The void content is represented by a liquid absorption amount (ml/m$^2$) absorbed for 2 seconds, when measured according to a method described in J. TAPPI, Paper Pulp Test No. 51 (1987), a liquid absorption test of paper or paper board (Bristow Method). The liquid used in this method is pure water (deionized water). The void content of the hydrophilic support can be measured by means of a Bristow Tester Type II (pressure type) produced by Kumagaya Rikikogyo Co., Ltd.

The methods of preparing a hydrophilic support having voids are as follows:

An aluminum plate having voids can be prepared, for example, by adjusting sealing treatment conditions under which the aluminum plate was treated. The anodized aluminum plate surface is porous, but the anodized aluminum plate is ordinarily subjected to sealing treatment employing hot water of 90 to 1000° C., a heated aqueous potassium dichromate solution or a heated aqueous nickel acetate solution to obtain a hydrophilic support. In the invention, the sealing treatment is advantageously carried out at lower temperature, that is, 70 to 80° C., whereby the intended void content of the hydrophilic support is obtained.

The hydrophilic support comprising a hydrophilic layer having voids provided on a flexible substrate can be prepared, for example, by coating on the substrate a hydrophilic layer containing 30 to 70 weight % of the following porous particles.

a. Necklace-shaped Colloidal Silica Particles

Necklace-shaped colloidal silica particles used in the invention refer to so-called "pearl necklace-shaped" silica particles in which spherical silica particles having a primary order particle diameter of 10 to 50 nm combine to give a length of 50 to 400 nm. Examples of the necklace-shaped colloidal silica particles include Snowtex PS series produced by Nissan Kagaku Kogyo Co., Ltd. The alkaline products of the series include Snowtex PS-S (an average particle diameter of 110 nm in a combined form), Snowtex PS-M (an average particle diameter of 120 nm in a combined form), and Snowtex PS-L (an average particle diameter of 170 nm in a combined form) . The corresponding acidic products are Snowtex PS-S-O, Snowtex PS-M-O, and Snowtex PS-L-O, respectively. The use of the alkaline products, Snowtex PS-S, Snowtex PS-M or Snowtex PS-L is preferable in view of reduced stains even at a long run of printing.

b) Porous Silica Particles or Porous Aluminosilicate Particles

Porous silica particles are generally synthesized according to a wet process or a dry process. In the wet process an aqueous silicate solution is neutralized to produce gel, dried and pulverized, or is neutralized to produce precipitates and the resulting precipitates are pulverized. In the dry process silicon tetrachloride is burned together with hydrogen and oxygen to produce silica particles. The porosity or particle diameter of these particles can be controlled adjusting their manufacturing conditions.

Porous aluminosilicate particles can be synthesized according to a method disclosed in Japanese Patent O.P.I. Publication No. 10-71764. That is, the porous aluminosilicate particles are amorphous complex particles synthesized by hydrolyzing a mixture of aluminum alkoxide and silicon alkoxide. It is possible to synthesize the particles to give an alumina to silica ratio of 1:4 to 4:1 by weight. The particles used in the invention may be complex particles having three or more components, which are synthesized by hydrolyzing a mixture of aluminum alkoxide, silicon alkoxide and one or more metal alkoxides other than the aluminum alkoxide and silicon alkoxide. With respect to porosity of the particles, particles before dispersion have a pore volume of preferably not less than 1.0 ml/g, more preferably not less than 1.2 ml/g, and most preferably 1.8 to 2.5 ml/g. The particle diameter of the porous silica particles or porous aluminosilicate particles is preferably not more than 0.3 μm in minimizing stains at non-image portions without lowering the hydrophilic layer strength. In order to decrease the particle diameter, the particles can be pulverized employing ceramic beads as a dispersing medium.

c) Zeolite Particles

Zeolite is crystalline aluminosilicate, and a porous compound having voids of a regular three dimensional network structure with a pore diameter of 0.3 to 1.0 nm. Natural or synthetic zeolite is represented by the following formula:

$$(M_1, \tfrac{1}{2}M_2)m(AlmSinO_2(m+n)).XH_2O$$

wherein $M_1$ and $M_2$ independently represent a replacement cation, $M_1$ represents, for example, $Li^+$, $Na^+$, $K^+$, $Tl^+$, $Me_4N^+$ (TMA), $Et_4N^+$ (TEA), $Pr_4N^+$ (TPA), $C_7H_{15}N_2^+$, or $C_8H_{16}N^+$, and $M_2$ represents, for example, $Ca^{2+}$, $Mg^{2+}$, $Ba^{2+}$, $Sr^{2+}$, or $C_8H_{18}N_2^{2+}$, and X represents an integer, provided that $n \geqq m$, and n/m is not more than 1. A higher n/m ratio, that is, a higher Al/Si ratio provides higher polarity and therefore, provides higher hydrophilicity, since the replacement cation content is higher. The Al/Si ratio is preferably 0.4 to 1.0, and more preferably 0.8 to 1.0. The zeolite particles used in the invention are preferably synthetic zeolite particles which have a stable Al/Si ratio and a comparatively sharp particle diameter distribution. Examples of the zeolite particles include zeolite A, $Na_{12}(Al_{12}Si_{12}O_{48}).27H_2O$ (Al/Si ratio=1.0) , zeolite X, $Na_{86}(Al_{86}Si_{106}O_{384}).264H_2O$ (Al/Si ratio=0.811), and zeolite Y, $Na_{56}(Al_{56}Si_{136}O_{383}).250H_2O$ (Al/Si ratio=0.412). The hydrophilic support comprising zeolite particles with an Al/Si ratio of from 0.4 to 1.0 improves hydrophilicity of the hydrophilic layer itself, minimizes stains at printing, provides high water tolerance at printing, and minimizes stains occurring due to finger touch. The Al/Si ratio of less than 0.4 provides insufficient hydrophilicity, and lowers the above-described effects. The particle diameter of the zeolite particles either in the hydrophilic layer or after its pulverizing or dispersion process is preferably not more than 0.3 μm. In order to decrease the particle diameter, the particles can be pulverized employing ceramic beads as a dispersing medium.

The thickness of the hydrophilic layer on the flexible substrate is preferably 1.0 to 10.0 μm, and more preferably 1.5 to 6.0 μm.

It is preferred in the invention that the hydrophilic support in the invention has pits on its surface on the image forming layer side. The pits in the invention refer to concaves having a radius (μm) of curvature of 1.0 to 10.0 μm.

FIG. 1 shows a sectional view of the pit formed on the surface of the hydrophilic support. In FIG. 1, R represents a radius (μm) of curvature of the pit, and L represents depth (μm) of the pit. In the invention, the average radius (μm) of curvature of ten pits is preferably more than one-half of the average particle diameter (μm) of the oleophilic heat-fusible particles contained in the heat sensitive image forming layer. In the invention, the average depth (μm) of ten pits is preferably less than the average particle diameter (μm) of the oleophilic heat-fusible particles contained in the heat sensitive image forming layer. The average depth (μm) of ten pits in the invention is preferably 0.10 to 0.80 μm, and more preferably 0.30 to 0.50 μm. The pit density of the hydrophilic support is preferably 20 to 1000 per an area of 10×10 μm, and more preferably 40 to 300 per an area of 10×10 μm. The number per an area of 10×10 μm of pits is counted employing a transmission electron microscope, and the pit density is obtained.

An aluminum plate having the intended pits can be prepared, for example by appropriately selecting electrolytical etching conditions. The hydrophilic layer having the intended pits provided on a flexible substrate, which is optionally cross-linked and which contains a hydrophilic binder and/or hydrophilic particles such as film-forming colloidal silica particles, can be obtained, for example according to the method disclosed in Japanese Patent Application No. 11-276607. According to this method, a hydrophilic layer coating solution containing a hydrophilic binder and/or hydrophilic particles such as film-forming colloidal silica particles and a coating solution containing particles for forming pits are coated on a flexible substrate, dried, and then the coated surface is rubbed while spraying water thereto to remove the particles and thereby form pits. Thus, a hydrophilic support having pits is obtained. In order to obtain a radius of curvature in the invention of the pits, the particles for forming pits preferably have an average particle diameter greater than that of the oleophilic heat-fusible particles. In order to obtain a depth L in the invention of the pits, the ratio by weight of (particles for forming pits):(a hydrophilic binder and/or hydrophilic particles such as film-forming colloidal silica particles) is preferably 80 to 50:20 to 50.

The radius (R) of curvature and the depth L of pits herein referred to imply an average radius of curvature and an average depth of ten pits, respectively. The ten pits are arbitrarily selected from the pits on the surface of the hydrophilic support. The pits are observed employing a non-contact surface roughness tester produced by WYKO Co., Ltd., and the average radius of curvature and average depth are computed. The radius curvature and depth of the pits are obtained by the following method.

Figure 2:
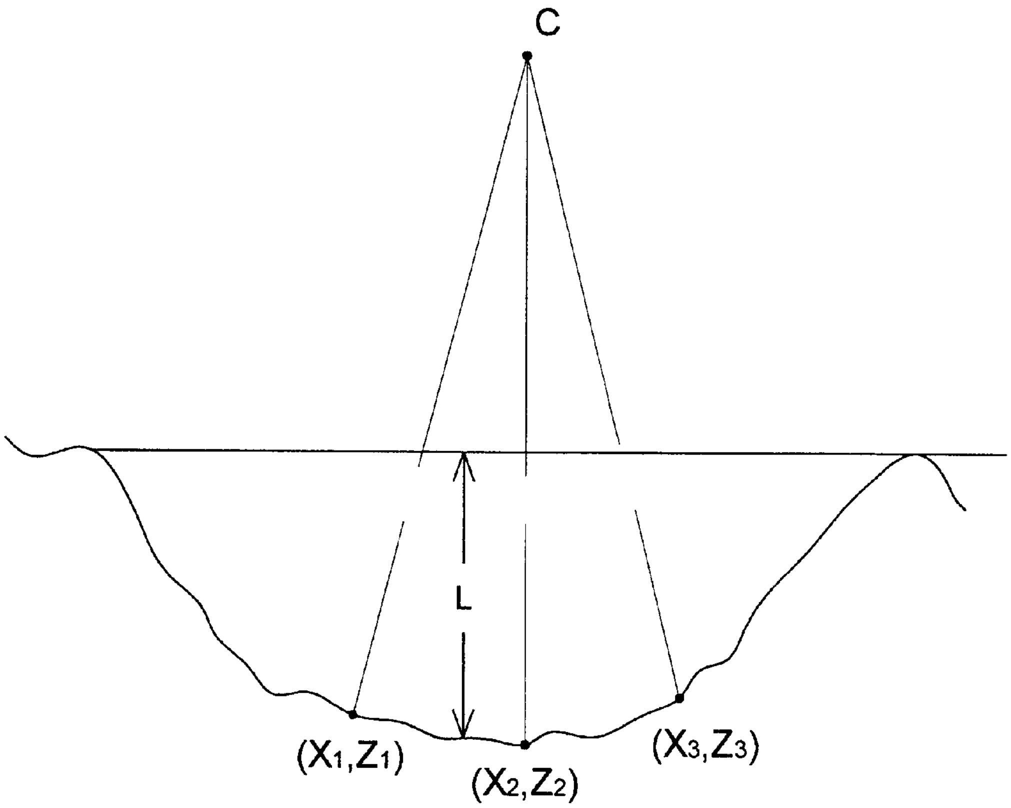
FIG. 2 shows a sectional view of a pit for explaining a method obtaining a radius of curvature and a depth of the pit.

In FIG. 2, the section of the pit containing the pit center C is regarded as an X-Z coordinate, and different three points ($X_1$, $Z_1$), ($X_2$, $Z_2$), and ($X_3$, $Z_3$) positioned on the circumference at the vicinity of the pit bottom are selected. The coordinate values of the three points are substituted for X and Z of the following Formula, and constants a, b and R are obtained.

Formula $$(X-a)^2+(Z-b)^2=R^2$$

wherein X represents an abscissa of the coordinate, Y represents an ordinate of the coordinate, a represents an abscissa of the coordinate of a center of the pit arc, b represents an ordinate of the coordinate of a center of the pit arc, and R represents a radius of curvature. The thus obtained R is a radius of curvature of the pits. The depth L of the pit is obtained from the difference between the maximum of Z values and the minimum of Z values. The radius of curvature of the pits in the invention is an average of radii of curvatures of ten pits arbitrarily selected from the pits in the invention, and the depth of the pits in the invention is an average of depths of ten pits arbitrarily selected from the pits in the invention.

The planographic printing plate precursor of the invention is a printing precursor comprising the above described hydrophilic support and provided thereon, a heat sensitive image forming layer containing oleophilic heat-fusible particles. It is preferred that the heat sensitive image forming layer further contains at least a cross-linking agent, or further contains a cross-linking agent and a cross-linking accelerator.

In the invention the cross-linking agent or a cross-linking accelerator is preferably contained in the oleophilic heat-fusible particles. When the cross-linking agent is contained inside the oleophilic heat-fusible particles of the image forming layer, it is preferred that the cross-linking accelerator is contained in the image forming layer but outside the oleophilic heat-fusible particles. When the cross-linking accelerator is contained inside the oleophilic heat-fusible particles of the image forming layer, it is preferred that the cross-linking agent is contained in the image forming layer but outside the oleophilic heat-fusible particles. This provides a printing precursor having a good storage stability. Herein, the expression "the cross-linking agent or a cross-linking accelerator is contained in the oleophilic heat-fusible particles" means that the cross-linking agent or a cross-linking accelerator may exist on the surface of the oleophilic heat-fusible particles. The expression "the cross-linking agent or a cross-linking accelerator is contained inside the oleophilic heat-fusible particles" means that the cross-linking agent or a cross-linking accelerator does not substantially exist or does not exist on the surface of the oleophilic heat-fusible particles.

The cross-linking agents used in the invention include a compound having a functional group such as an isocyanate group, an epoxy group, a hydroxy group, a carboxyl group, a methylol group, or an amino group. The ionic cross-linking agents include an ionomer resin.

The cross-linking accelerators used in the invention include an organic tin compound and conventional acid generating compounds. When a compound having an isocyanate group is used as a cross-linking agent, an organic tin compound is preferably used as a cross-linking accelerator. When a compound having an epoxy group is used as a cross-linking agent, conventional acid generating compounds are preferably used as the cross-linking accelerator.

The cross-linking agents in the invention may be cross-linked to each other, but are preferably cross-linked to a hydrophilic support. In the latter case, the hydrophilic layer of the hydrophilic support is preferably provided with a functional group such as an isocyanate group, an epoxy group, a hydroxy group, a carboxyl group, a methylol group, or an amino group, which is capable of cross-linking with a cross-linking agent. When an ionomer resin is used as a cross-linking agent, the hydrophilic layer of the hydrophilic support is preferably provided with a divalent or polyvalent ion. As a method of providing the hydrophilic layer with the functional group or the divalent or polyvalent ion, there is, for example, a method of coating on the hydrophilic support a diluted solution containing a silane coupling agent having the above-described functional group or a clay mineral having the divalent or polyvalent ion.

The cross-linking agent or cross-linking accelerator is preferably contained in the oleophilic heat-fusible particles. When the cross-linking agent is contained in the oleophilic heat-fusible particles, the cross-linking accelerator is preferably contained outside the oleophilic heat-fusible particles in the heat sensitive image forming layer. When the cross-linking accelerator is contained in the oleophilic heat-fusible particles, the cross-linking agent is preferably contained outside the oleophilic heat-fusible particles in the heat sensitive image forming layer. The heat sensitive image forming layer containing the cross-linking agent or cross-linking accelerator separately provides cross-linking properties to the exposed portions, whereby printing durability and storage stability are improved.

The oleophilic heat-fusible particles in the heat sensitive image forming layer are used in the form of an aqueous dispersion containing an oleophilic and thermoplastic resin. The heat sensitive image forming layer herein referred to may be a layer having a certain thickness, or may be a layer consisting of heat-fusible particles which are adhered onto the surface of the hydrophilic support.

The oleophilic and thermoplastic resins used in the invention are preferably waxes, acryl resins, or synthetic rubbers each having a melting point of 70 to 180° C. As the waxes, natural waxes such as carnauba wax, bees wax, spermaceti wax, Japan wax, jojoba oil, lanolin, ozocerite, paraffin wax, montan wax, candelilla wax, ceresine wax, microcrystalline wax and rice wax, polyethylene wax, FT wax, montan wax derivatives, paraffin wax derivatives, microcrystalline wax derivatives, or higher fatty acids are preferable. Examples of the acryl resins polymers or copolymers obtained by polymerizing one or more of methyl methacrylate, butyl acrylate, octyl acrylate, 2-ethylhexyl acrylate and styrene. Examples of the synthetic rubbers include polybutadiene, polyisoprene, polychloroprene, styrene-butadiene copolymer, an acrylate-butadiene copolymer, a methacrylate-butadiene copolymer, isobutylene-isoprene copolymer, acrylonitrile-butadiene copolymer and acrylonitrile-isoprene copolymer. In addition, examples of the oleophilic and thermoplastic resins include ionomer resins, vinyl acetate resins, vinyl chloride resins, urethane resins, polyesters, fluorinated resins, and silicone resins.

In the invention, the heat-fusible particles preferably have a melt viscosity of not more than 20 cps at 140° C. Heat-fusible particles having a melt viscosity exceeding 20 cps at 140° C. do not sufficiently permeate into the hydrophilic support at exposed portions, resulting in poor printing durability. Further, the heat-fusible particles preferably have a penetration of not more than 1. Heat-fusible particles having a penetration exceeding 1 do not provide sufficient layer strength, resulting in poor printing durability, and tend to produce stains at the portions accidentally rubbed with for example, finger nails. The preferred oleophilic heat-fusible particles are carnauba wax, candelilla wax, or FT wax.

The oleophilic heat-fusible particles can be prepared according to conventional preparation methods, for example, a method disclosed in "Bunsangijutsu Sogoshiryoshu" published by Keiei Kaihatsu Center Shuppanbu. As another preparation method, the oleophilic heat-fusible particles are prepared in the form of an aqueous dispersion in which a heat fusible resin is dispersed by fusibly mixing a heat fusible substance with hydrophilic substances such as a hydrophilic binder or colloidal silica particles, pouring the resulting mixture into warm water, and then vigorously stirring the mixture in a stirrer or a homogenizer, or by jetting the mixture through small holes into water. The average particle diameter of the heat-fusible particles is preferably not more than 1.0 μm. The content of the heat-fusible particles in the image forming layer is preferably 30 to 95 weight %, and more preferably 40 to 60 weight % based on the total solid weight of the image forming layer.

The heat sensitive image forming layer optionally contains a water soluble resin in order to prevent the oleophilic heat-fusible particles from adhering to one another at non-exposed portions. Examples of the water soluble resin include conventional water soluble polymers, for example, a synthetic homopolymer or copolymer such as polyvinyl alcohol, poly(meth)acrylic acid, poly(meth)acrylamide, polyhydroxyethyl(meth)acrylate or polyvinyl methyl ether, and a natural binder such as gelatin, polysaccharides, for example, dextrane, pullulan, cellulose, gum arabic, alginic acid, polyethylene glycol, or polyethylene oxide. The water soluble polymers in the invention are preferably oligosaccharides in providing a good printing durability while preventing the heat-fusible particles from adhering to another at non-exposed portions. Oligosaccharides are saccharides in which several monosaccharides condensate by dehydration to combine with another through a glycoside bond. In the invention, the preferable oligosaccharide is trehalose, maltose, lactose or sucrose. The water soluble polymer content of the image forming layer in the invention is preferably 5 to 70 weight %, and more preferably 10 to 60 weight %.

The heat sensitive image forming layer or the hydrophilic layer, which is provided on the flexible substrate and comprises a hydrophilic binder and/or hydrophilic particles such as film-forming colloidal silica particles, may contain a light-heat converting agent which can absorb light such as laser to generate heat. The intermediate layer, which may be provided between the hydrophilic layer and the flexible substrate, may be a light-heat conversion layer containing a light-heat converting agent.

The light-heat converting agent is preferably a compound which absorbs light and efficiently converts to heat, although different due to a light source used. For example, when a semi-conductor laser emitting near-infrared light is used as a light source, a near-infrared absorbent having absorption in the near-infrared light region is preferably used. Examples of the near-infrared absorbent include an inorganic compound such as carbon black, an organic compound such as a cyanine dye, a polymethine dye, an azulenium dye, a squalenium dye, a thiopyrylium dye, a naphthoquinone dye or an anthraquinone dye, and an organic metal complex of phthalocyanine, azo or thioamide type.

Exemplarily, the near-infrared absorbents include compounds disclosed in Japanese Patent O.P.I. Publication Nos. 63-139191, 64-33547, 1-160683, 1-280750, 1-293342, 2-2074, 3-26593, 3-30991, 3-34891, 3-36093, 3-36094, 3-36095, 3-42281, 3-97589 and 3-103476. These compounds can be used singly or in combination of two or more kinds thereof. The light-heat converting agent content in the hydrophilic layer or in the intermediate layer is preferably 1 to 15 weight %, and the light-heat converting agent content in the image forming layer is preferably 1 to 20 weight %.

Preparation of Planographic Printing Plate

Images are recorded on the planographic printing plate precursor employing a thermal head or a laser. As the laser, a laser emitting light having an emitting wavelength of 300 to 1500 nm is used. Examples thereof include Ar ion laser, Kr ion laser, He–Ne laser, He–Cd laser, ruby laser, glass laser, titanium sapphire laser, dye laser, nitrogen laser, metal vapor laser, eximer laser, a semi-conductor laser, and a YAG laser. Image recording can be carried out exposing the printing precursor by means of a plate setter or a direct imaging printing machine equipped with an exposure source.

The above-exposed planographic printing plate precursor is mounted without being developed with a specific developer on the plate cylinder of a printing machine, and treated supplying ink and/or dampening water to the plate precursor while rotating the plate cylinder, followed by printing.

EXAMPLES

The invention will be detailed according to the following examples, but is not limited thereto. In the examples, the term "parts" is parts by weight, unless otherwise specified, and the term, "heat-fusible particles" refers to oleophilic heat-fusible particles.

Example 1

A 200 μm thick PET support was corona discharged, and the following subbing layer coating solution was coated onto the resulting support to obtain a subbing layer with a dry thickness of 4.0 μm, and heated at 70° C. for 3 minutes.

Subbing Layer Coating Solution

| | |
|---|---|
| Vylon 200 (linear polyester resin produced by Toyo Boseki Co., Ltd.) | 9.0 parts |
| Colonate L (isocyanate hardener, Produced by Nihon Urethan Co., Ltd.) | 1.2 parts |
| Methyl ethyl ketone | 89.8 parts |

The following light-heat conversion layer coating solution was coated on the subbing layer to obtain a light-heat conversion layer with a dry thickness of 4.0 μm, and heated at 70° C. for 3 minutes.

| | |
|---|---|
| Snowtex S (colloidal silica, solid 30% produced by Nissan Kagakukogyo Co., Ltd.) | 16.00 parts |
| Snowtex PSM (colloidal silica, solid 20% produced by Nissan Kagakukogyo Co., Ltd.) | 24.00 parts |
| Aqueous 30% solution of trehalose (Trehaose, produced by Hayashihara Kenkyusho) | 3.33 parts |
| Aqueous 20% dispersion solution of AMT08 (alminosilicate particles with an average particle diameter of 0.8 μm, produced by Mizusawa Kagakukogyo Co., Ltd.) | 26.67 parts |
| Hitasol GF66B (graphite dispersion solution, Solid content 10%, produced by Hitachi Funmatsuyakin Co., Ltd.) | 14.00 parts |

Each of the following hydrophilic layer coating solutions 1 through 6 was coated as shown in Table 1 on the light-heat conversion layer employing a wire bar #10, and heated at 70° C. for 3 minutes to obtain a hydrophilic layer. Thus, hydrophilic supports 1, 2, 3, 4, 5, and 6 were obtained as shown in Table 1. The hydrophilic layer surface of hydrophilic supports 1, 2 and 3 was rubbed with a sponge while spraying flowing water, and then dried at 70° C. for 3 minutes. The thickness of the hydrophilic layer was 2.0 μm.

Pits on the surface of the hydrophilic supports in Table 1 were observed employing a non-contact three dimensional roughness meter (PST Plus produced by WYKO Co., Ltd.). In the support having pits, ten arbitrary pits were selected and their radius of curvature and depth were measured and a respective average was computed. Further, the void content of the hydrophilic supports was determined employing a Bristow Tester Type II (pressure type) produced by Kumagaya Rikikogyo Co., Ltd.

| | |
|---|---|
| (Hydrophilic layer coating solution 1) | |
| Snowtex S (colloidal silica, solid content 30% produced by Nissan Kagakukogyo Co., Ltd.) | 34.50 parts |
| Hitasol GF66B (graphite dispersion solution, solid content 10%, produced by Hitachi Funmatsuyakin Co., Ltd.) | 3.38 parts |
| Aqueous 30% solution of trehalose (Trehaose produced by Hayashihara Kenkyusho) | 1.88 parts |
| Aqueous 15% dispersion solution of Flavicafine FS-D (calcium alginate particles with an average particle diameter of 2 μm, produced by Nisshinbo Co., Ltd.) | 25.00 parts |
| Pure water | 32.25 parts |
| (Hydrophilic layer coating solution 2) | |
| Snowtex S (colloidal silica, solid content 30% produced by Nissan Kagakukogyo Co., Ltd.) | 7.67 parts |
| Aqueous 10% dispersion solution of AMT silica #200 (produced by Mizusawa Kagakukogyo Co., Ltd.) pulverized in a sand grinder to an average particle diameter of 0.2 μm | 23.00 parts |
| Hitasol GF66B (graphite dispersion solution, solid content 10%, produced by Hitachi Funmatsuyakin Co., Ltd.) | 1.50 parts |
| Aqueous 30% solution of trehalose (Trehaose produced by Hayashihara Kenkyusho) | 0.83 parts |
| Aqueous 10% dispersion solution of Flavicafine FS-D (calcium alginate particles with an average particle diameter of 2 μm, produced by Nisshinbo Co., Ltd.) | 50.00 parts |
| Pure water | 17.00 parts |

-continued

| (Hydrophilic layer coating solution 3) | |
|---|---|
| Snowtex S (colloidal silica, solid content 30% produced by Nissan Kagakukogyo Co., Ltd.) | 7.67 parts |
| Aqueous 10% dispersion solution of AMT silica #200 (produced by Mizusawa Kagakukogyo Co., Ltd.) pulverized in a sand grinder to an average particle diameter of 0.2 μm | 23.00 parts |
| Hitasol GF66B (graphite dispersion solution, solid content 10%, produced by Hitachi Funmatsuyakin Co., Ltd.) | 1.50 parts |
| Aqueous 30% solution of trehalose (Trehaose produced by Hayashihara Kenkyusho) | 0.83 parts |
| Aqueous 10% dispersion solution of MP-1000 (polymethyl methacrylate particles with an average particle diameter of 0.5 μm, produced by Sokenkagaku Co., Ltd.) | 50.00 parts |
| Pure water | 17.00 parts |
| (Hydrophilic layer coating solution 4) | |
| Snowtex S (colloidal silica, solid content 30% produced by Nissan Kagakukogyo Co., Ltd.) | 15.33 parts |
| Aqueous 10% dispersion solution of AMT silica #200 (produced by Mizusawa Kagakukogyo Co., Ltd.) pulverized in a sand grinder to an average particle diameter of 0.2 μm | 46.00 parts |
| Hitasol GF66B (graphite dispersion solution, solid content 10%, produced by Hitachi Funmatsuyakin Co., Ltd.) | 3.00 parts |
| Aqueous 30% solution of trehalose (Trehaose produced by Hayashihara Kenkyusho) | 1.67 parts |
| Pure water | 34.00 parts |
| (Hydrophilic layer coating solution 5) | |
| Snowtex S (colloidal silica, solid content 30% produced by Nissan Kagakukogyo Co., Ltd.) | 30.67 parts |
| Hitasol GF66B (graphite dispersion solution, solid content 10%, produced by Hitachi Funmatsuyakin Co., Ltd.) | 3.00 parts |
| Aqueous 30% solution of trehalose (Trehaose produced by Hayashihara Kenkyusho) | 1.67 parts |
| Pure water | 64.63 parts |
| (Hydrophilic layer coating solution 6) | |
| Aqueous 10% dispersion solution of AMT silica #200 (produced by Mizusawa Kagakukogyo Co., Ltd.) pulverized in a sand grinder to an average particle diameter of 0.2 μm | 92.00 parts |
| Hitasol GF66B (graphite dispersion solution, solid content 10%, produced by Hitachi Funmatsuyakin Co., Ltd.) | 3.00 parts |
| Aqueous 30% solution of trehalose (Trehaose produced by Hayashihara Kenkyusho) | 1.67 parts |
| Pure water | 3.33 parts |

TABLE 1

| Hydrophilic support No. | Hydrophilic layer coating solution No. | Hydrophilic support surface: Presence of pits | Radius of curvature of pits (μm) | Depth of pits (μm) | Void content ($ml/m^2$) |
|---|---|---|---|---|---|
| 1 | 1 | Yes | 1.2 | 0.9 | 21 |
| 2 | 2 | Yes | 1.2 | 0.3 | 28 |
| 3 | 3 | Yes | 0.6 | 0.3 | 17 |
| 4 | 4 | No | — | — | 30 |
| 5 | 5 | No | — | — | 16 |
| 6 | 6 | No | — | — | 45 |

Preparation of Heat-fusible Particles to be Added to the Image Forming Layer

The following composition containing heat-fusible particles was placed in a flask, heated to 150° C., and fusibly mixed for 30 minutes. The resulting mixture was added dropwise to 70° C. water of pH 12 while stirring and further stirred vigorously for 1 to 5 hours. Thus, an aqueous dispersion containing heat-fusible particles with an intended average particle diameter was obtained. Water was added to the dispersion to obtain an aqueous dispersion solution having a solid content of 40%. Details are shown in Table 2 described later.

| (Heat-fusible particles 1) | |
|---|---|
| Microcrystalline wax (a melting point of 108° C., a melt viscosity of 10 cps, a penetration of 2) | 38.5 parts |
| KL05 (Polyvinyl alcohol, produced by Nihon Goseikagaku Kogyo Co., Ltd.) | 1.5 parts |

The vigorous stirring was carried out for 5 hours, and the average particle diameter of the resulting heat-fusible particles in the above-obtained solution was 0.5 μm.

| (Heat-fusible particles 2) | |
|---|---|
| Microcrystalline wax (a melting point of 108° C., a melt viscosity of 10 cps, a penetration of 2) | 38.5 parts |
| KL05 (Poluvinyl alcohol, produced by Nihon Goseikagaku Kogyo Co., Ltd.) | 1.5 parts |

The vigorous stirring was carried out for 1 hour, and the average particle diameter of the resulting heat-fusible particles in the above-obtained solution was 2.0 μm.

| (Heat-fusible particles 3) | |
|---|---|
| FT wax (a melting point of 98° C., a melt viscosity of 6 cps, a penetration of 0.9) | 38.5 parts |
| KL05 (Polyvinyl alcohol, produced by Nihon Goseikagaku Kogyo Co., Ltd.) | 1.5 parts |

The vigorous stirring was carried out for 3 hours, and the average particle diameter of the resulting heat-fusible particles in the above-obtained solution was 0.6 μm.

The following image forming layer coating solution was coated on the hydrophilic layer of the hydrophilic support as obtained above to give a coating amount of 0.5 μm, and dried at 55° C. for 5 minutes. Thus, a planographic printing plate precursor sample was obtained.

| (Image forming layer coating solution) | |
|---|---|
| Above-obtained aqueous dispersion containing heat-fusible particles 1, 2 or 3 and having a solid content of 40% | 12.50 parts |
| Aqueous 30% solution of trehalose (Trehaose produced by Hayashihara Kenkyusho) | 16.50 parts |
| Pure water | 71.00 parts |

The resulting planographic printing plate precursor sample prepared above was imagewise exposed to a semi-conductor laser (having a wavelength of 830 nm), while changing the laser scanning speed, the exposure amount at the precursor surface being changed at an interval of 50 $mj/cm^2$ in the range of 200 to 500 $mj/cm^2$. The exposed image had a 2% dot image and a 50% square dot image with a screen line number of 175. The laser light spot diameter was 10 $\mu$m, and the resolving degree was 2,000 dpi in both the main scanning direction and sub-scanning direction. The term, "dpi" shows the number of dots per 2.54 cm. Thus, a planographic printing plate was obtained.

The above-obtained planographic printing plate was mounted without being developed on the plate cylinder of a printing machine, Heidel GTO. An etching solution, in which SEU-3 (produced by Konica Corporation) was diluted with water by a factor of 45, and printing ink, Hyecho Magenta (produced by Toyo Ink Manufacturing Co.) were applied to the mounted printing plate, and printed on art paper.

Evaluation

The following evaluations were carried out. The results are shown in Table 2.

Number of Paper Sheets Printed at the Initial Printing Stage

The number of paper sheets, printed at the initial printing stage until the difference of density between an original paper sheet and the non-image portions of the printed paper sheets was less than 0.02, was counted. The low number of the paper sheets shows that loss of paper sheets printed at the initial printing stage is reduced. The density was measured employing a densitometer, RD904 produced by Macbeth Co., Ltd.

Printing Durability

When printing was carried out employing a printing plate prepared so that the 50% square dot image of an original image was exactly reproduced in printed paper sheets without dot gain or dot decrease, the number of paper sheets printed until dots of the 2% dot image portion began disappearing on the printed paper sheets, was counted, and the count was evaluated as printing durability.

Resistance to Rubbing

Printing was carried out employing a planographic printing plate prepared from a printing precursor initially rubbed with finger nails at portions corresponding to non-image portions. A rating of "A" shows that no stains were observed at portions of printed paper sheets corresponding to the rubbed portions, a rating of "B" shows that stains were observed at initial printing stage but disappeared before 200 sheets were printed at portions of printed paper sheets corresponding to the rubbed portions, and a rating of "C" shows that stains were observed at portions of printed paper sheets corresponding to the rubbed portions, and was problematic for practical use.

TABLE 2

| Printing precursor No. | Hydrophilic support No. | Heat-fusible particles No. | Heat-fusible Particles: Average particle diameter ($\mu$m) | Melting point (° C.) | Melt viscosity (cps) | Penetration | Paper sheet number printed at initial stage | Printing durability | Resistance to rubbing | Remarks |
|---|---|---|---|---|---|---|---|---|---|---|
| 1 | 1 | 1 | 0.5 | 108 | 10 | 2 | 200 | 10,000 | B | Inv. |
| 2 | 2 | 3 | 0.6 | 98 | 6 | 0.9 | 30 | 50,000 | A | Inv. |
| 3 | 3 | 2 | 2.0 | 108 | 10 | 2 | 30 | 2,000 | C | Comp. |
| 4 | 4 | 1 | 0.5 | 108 | 10 | 2 | 30 | 10,000 | B | Inv. |
| 5 | 4 | 3 | 0.6 | 98 | 6 | 0.9 | 30 | 30,000 | A | Inv. |
| 6 | 5 | 1 | 0.5 | 108 | 10 | 2 | 20 | 1,000 | C | Comp. |
| 7 | 6 | 1 | 0.5 | 108 | 10 | 2 | 400 | 1,000 | C | Comp. |

Inv.: Invention, Comp.: Comparative

As is apparent from Tables 1 and 2, inventive printing precursor samples, comprising a hydrophilic support having a void content of from 20 to 40 $ml/m^2$, provide reduced loss of paper sheets printed at the initial printing stage, and high printing durability. Further, inventive printing precursor samples No. 2 and 5, comprising an image forming layer containing heat-fusible particles having a penetration of not more than 1, provide higher resistance to rubbing and higher printing durability, as compared with inventive printing precursor samples No. 1 and 4, comprising an image forming layer containing heat-fusible particles having a penetration of more than 1. On the other hand, comparative printing precursor samples No. 2, 6, and 7, comprising a hydrophilic support having a void content falling outside the range of from 20 to 40 $ml/m^2$, provide poor results in two or more of (1) the number of printed paper sheets at the initial printing stage, (2) printing durability and (3) resistance to rubbing.

Example 2

The hydrophilic layer of hydrophilic support 2 as obtained in Example 1 above was dip-coated with an aqueous solution containing 0.1 % of an aminosilane coupler TSL 8331, and heat-treated at 100° C. for 10 minutes. Thus, hydrophilic support 7 as shown in Table 3, having an amino group on the hydrophilic layer surface, was obtained.

TABLE 3

| Hydrophilic support No. | Hydrophilic layer coating solution No. | Hydrophilic support surface: Presence of pits | Radius of curvature of pits (μm) | Depth of pits (μm) | Void content ($ml/m^2$) | Remarks |
|---|---|---|---|---|---|---|
| 7 | 2 | Yes | 1 | 0.3 | 25 | Amino-silane coupler treatment |

Pits on the hydrophilic layer surface of hydrophilic support 7 in Table 3 were observed employing a non-contact three dimensional roughness meter (PST Plus produced by WYKO Co., Ltd.). Ten arbitrary pits of the pits were selected, their radius of curvature and depth were measured, and a respective average was computed in the same manner as in Example 1. Further, the void content of the hydrophilic layer was determined employing a Bristow Tester Type II (pressure type) produced by Kumagaya Rikikogyo Co., Ltd. The hydrophilic support 7 treated with the aminosilane coupler provided the pits and void content each falling within the preferred range in the invention.

Preparation of Heat-fusible Particles to be Added to the Image Forming Layer

The following composition containing heat-fusible particles was placed in a flask, heated to 120° C., and fusibly mixed for 30 minutes. The resulting mixture was added dropwise to 400 parts of a 70° C. aqueous solution containing 5 weight % of surfactant (polyoxyethylene stearyl ether) while stirring and further stirred vigorously for 2 hours. Thus, an aqueous dispersion of heat-fusible particles with an average particle diameter of 0.5 μm containing a cross-linking agent was obtained. Water was added to the dispersion to obtain an aqueous dispersion solution having a solid content of 20%.

| | |
|---|---|
| (Heat-fusible particles 4) | |
| Candelilla wax (a melting point of 65° C., a melt viscosity of 5 cps, a penetration of 0.9) | 90.00 parts |
| Blocked isocyanate PW-2400 (produced by Takeda Yakuhin Co., Ltd., block dissociation temperature of 140 to 180° C.) | 10.00 parts |
| (Heat-fusible particles 5) | |
| Candelilla wax (a melting point of 65° C., a melt viscosity of 5 cps, a penetration of 0.9) | 90.00 parts |
| Organotin compound 1 described below | 5.00 parts |
| Organotin compound 1 | |
| $Sn(R_1)(R_2)(COOR_3)(COOR_4)$ | |
| (Heat-fusible particles 6) | |
| Candelilla wax (a melting point of 65° C. a melt viscosity of 5 cps, a penetration of 0.9) | 100.00 parts |

Each of the following image forming layer coating solutions 4 and 5 was coated on the hydrophilic layer of the hydrophilic support 7 as obtained above to obtain an image forming layer with a coating amount of 0.5 μm, and dried at 55° C. for 5 minutes. Thus, a planographic printing plate precursor samples 8 and 9 were obtained.

| | |
|---|---|
| (Image forming layer coating solution 4) | |
| Above-obtained aqueous dispersion containing heat-fusible particles 4 and having a solid content of 20% | 20.00 parts |
| Above-obtained aqueous dispersion containing heat-fusible particles 5 and having a solid content of 20% | 10.00 parts |
| Trehalose (Trehaose produced by Hayashihara Kenkyusho) | 4.00 parts |
| Pure water | 66.00 parts |
| (Image forming layer coating solution 5) | |
| Above-obtained aqueous dispersion containing heat-fusible particles 6 and having a solid content of 20% | 24.00 parts |
| Blocked isocyanate Elastoron BN69 (solid content 40 weight %, block dissociation temperature of 120° C., produced by Daiichi Kogyo Seiyaku Co., Ltd.,) | 2.50 parts |
| Trehalose (Trehaose produced by Hayashihara Kenkyusho) | 4.00 parts |
| Organotin compound 1 | 0.20 parts |
| Trehalose (Trehaose produced by Hayashihara Kenkyusho) | 4.00 parts |
| Pure water | 69.30 parts |

The resulting planographic printing plate precursor sample prepared above was imagewise exposed to a semiconductor laser (having a wavelength of 830 nm), while changing the laser scanning speed, the exposure amount at the precursor surface being changed at an interval of 50 $mj/cm^2$ in the range of 200 to 500 $mj/cm^2$. The exposed image had a 2% dot image and a 50% square dot image with a screen line number of 175. The laser light spot diameter was 10 μm, and the resolving degree was 2,000 dpi in both the main scanning direction and sub-scanning direction. The term, "dpi" shows the number of dots per 2.54 cm. Thus, a planographic printing plate was obtained.

The above-obtained planographic printing plate was mounted without being developed on the plate cylinder of a printing machine, Heidel GTO. An etching solution, in which SEU-3 (produced by Konica Corporation) was diluted with water by a factor of 45, and printing ink, Hyecho Magenta (produced by Toyo Ink Manufacturing Co.) were applied to the mounted printing plate, and printed on art paper.

Further, the planographic printing plate precursor sample was stored at 55° C. for 3 days (arid incubation test), and then exposed and processed in the same manner as above.

Evaluation

The following evaluations were carried out.

Number of Paper Sheets Printed at the Initial Printing Stage

The number of paper sheets, printed at the initial printing stage until the difference of density between an original paper sheet and the non-image portions of the printed paper sheets was less than 0.02, was counted. The low number of the paper sheets shows that loss of paper sheets printed at the initial printing stage is reduced. The density was measured employing a densitometer, RD904 produced by Macbeth Co., Ltd.

Printing Durability

When printing was carried out employing a printing plate prepared so that the 50% square dot image of an original image was exactly reproduced in printed paper sheets without dot gain or dot decrease, the number of paper sheets printed until dots of the 2% dot image portion began disappearing on the printed paper sheets, was counted, and the count was evaluated as printing durability.

Resistance to Rubbing

Printing was carried out employing a planographic printing plate prepared from a printing precursor initially rubbed with finger nails at portions corresponding to non-image portions. A rating of "A" shows that no stains were observed at portions of printed paper sheets corresponding to the rubbed portions, a rating of "B" shows that stains were observed at initial printing stage but disappeared before 200 sheets were printed at portions of printed paper sheets corresponding to the rubbed portions, and a rating of "C" shows that stains were observed at portions of printed paper sheets corresponding to the rubbed portions, and was problematic for practical use.

The results are shown in Table 4.

TABLE 4

| | | | | | Before storage | | | After storage | | | |
|---|---|---|---|---|---|---|---|---|---|---|---|
| Printing precursor No. | Hydrophilic support No. | Image forming coating solution No. | Heat-fusible particles | Vehicle | Paper sheet number printed at initial stage | Printing durability | Resistance to rubbing | Paper sheet number printed at initial stage | Printing durability | Resistance to rubbing | Remarks |
| 8 | 7 | 4 | * | ** | 20 | 90,000 | A | 20 | 90,000 | A | Inv. |
| 9 | 7 | 5 | *** | **** | 20 | 70,000 | A | 300 | 70,000 | B | Inv. |

Inv.: Invention

In Table 4, the term, "Vehicle" in the fifth column, means image forming layer portions except for the heat-fusible particles in the image forming layer.

In Table 4, mark "*" shows that the blocked isocyanate and organotin compound are contained in different heat-fusible particles, mark "" shows that the vehicle contains neither a cross-linking agent nor a cross-linking accelerator, mark "*" shows that the heat-fusible particles contains neither a cross-linking agent nor a cross-linking accelerator, and mark "****" shows that the vehicle contains both the blocked isocyanate and organotin compound.

As is apparent from Table 4 above, the planographic printing plate precursor, comprising in the image forming layer heat-fusible particles containing a cross-linking agent capable of cross-linking with the hydrophilic support, provided high printing durability, and the planographic printing plate precursor, comprising in the image forming layer both first heat-fusible particles containing a cross-linking agent and second heat-fusible particles containing a cross-linking accelerator, provided both high printing durability and excellent storage stability.

Effects of the Invention

The present invention provides a planographic printing plate precursor which increases printing durability, reduces loss of paper sheets printed at the initial printing stage, and presents stable printing performances after storage. The present invention further provides a planographic printing plate precursor which prevents stains produced due to finger nail rubbing, and therefor, easy to handle.

Disclosed embodiments can be varied by a skilled person without departing from the spirit and scope of the invention.

What is claimed is:

1. A planographic printing plate precursor comprising a hydrophilic support and an image forming layer containing oleophilic heat-fusible particles, wherein
the heat-fusible particles have an average particle diameter of not more than 1.0 μm, the hydrophilic support has voids, a void content of 20 to 40 ml/m$^2$ and pits on the surface on the image forming layer side, the average radius (μm) of curvature of ten pits being 1.0 to 10.0 μm and being greater than one-half of the average particle diameter (μm) of the heat-fusible particles.

2. The planographic printing plate precursor of claim 1, wherein the average depth (μm) of ten pits is less than the average particle diameter (μm) of the heat-fusible particles.

3. The planographic printing plate precursor of claim 1, wherein the heat-fusible particles contain a cross-linking agent.

4. The planographic printing plate precursor of claim 3, wherein the cross-linking agent is an agent capable of combining with the hydrophilic support through a covalent bond or an ionic bond by heat application.

5. The planographic printing plate precursor of claim 3, wherein the image forming layer other than the heat-fusible particles contains a cross-linking accelerator which promotes a cross-linking reaction of the cross-linking agent.

6. The planographic printing plate precursor of claim 1, wherein the image forming layer other than the heat-fusible particles contains a cross-linking agent and the heat-fusible particles contain a cross-linking accelerator which promotes a cross-linking reaction of the cross-linking agent.

7. The planographic printing plate precursor of claim 6, wherein the cross-linking agent is an agent capable of combining with the hydrophilic support through a covalent bond or an ionic bond by heat application.

8. The planographic printing plate precursor of claim 1, wherein the heat-fusible particles have a melt viscosity of not more than 20 cps at 140° C.

9. The planographic printing plate precursor of claim 1, wherein the heat-fusible particles have a penetration of not more than 1.

10. A planographic printing plate precursor of claim 1, wherein the hydrophilic support comprises a hydrophilic layer, and the hydrophilic layer contains a hydrophilic binder or film-forming hydrophilic particles.

11. The planographic printing plate precursor of claim 10, wherein the hydrophilic layer contains porous silica particles or colloidal silica particles.

12. The planographic printing plate precursor of claim 10, wherein the hydrophilic support is a plastic film with the hydrophilic layer provided thereon.

13. The planographic printing plate precursor of claim 1, wherein the heat-fusible particles comprise wax.

14. The planographic printing plate precursor of claim 1, wherein the image forming layer contains oligosaccharides.

* * * * *